US009816354B2

(12) United States Patent
Schnoor et al.

(10) Patent No.: US 9,816,354 B2
(45) Date of Patent: Nov. 14, 2017

(54) METHOD OF BREAKING METAL-CROSSLINKED POLYMERS

(71) Applicant: Halliburton Energy Services, Inc., Houston, TX (US)

(72) Inventors: Eli Allen Schnoor, Kingwood, TX (US); Aaron Gene Russell, Humble, TX (US); Lucas Fontenelle, Houston, TX (US); Jeremy Holtsclaw, Kingwood, TX (US); Ali Alwattari, Humble, TX (US); Dipti Singh, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/122,889

(22) PCT Filed: Apr. 7, 2014

(86) PCT No.: PCT/US2014/033167
§ 371 (c)(1),
(2) Date: Aug. 31, 2016

(87) PCT Pub. No.: WO2015/156759
PCT Pub. Date: Oct. 15, 2015

(65) Prior Publication Data
US 2017/0066961 A1 Mar. 9, 2017

(51) Int. Cl.
*E21B 37/00* (2006.01)
*C09K 8/035* (2006.01)
(Continued)

(52) U.S. Cl.
CPC .............. *E21B 37/00* (2013.01); *C09K 8/035* (2013.01); *C09K 8/512* (2013.01); *C09K 8/514* (2013.01); *C09K 8/685* (2013.01); *C09K 8/887* (2013.01); *C09K 8/90* (2013.01); *C09K 8/905* (2013.01); *C09K 2208/26* (2013.01); *E21B 43/26* (2013.01)

(58) Field of Classification Search
None
See application file for complete search history.

(56) References Cited

U.S. PATENT DOCUMENTS 3,727,687 A * 4/1973 Clampitt ................. B01J 19/06
166/275
4,552,674 A 11/1985 Brown et al.
(Continued)

FOREIGN PATENT DOCUMENTS

EP 0170053 A2 5/1986

OTHER PUBLICATIONS

Search Report and Written Opinion mailed Jan. 7, 2015 in PCT/US2014/033167, Halliburton Energy Services, Inc.
(Continued)

*Primary Examiner* — Anuradha Ahuja
(74) *Attorney, Agent, or Firm* — McAfee & Taft

(57) ABSTRACT

A method is provided for improved degradation of metal-crosslinked polymer gels, which are useful in oil and gas treating operations. In this method a polysaccharide having a higher degree of substitution than the polymer in the polymer gel is added to the gel. The polysaccharide removes the crosslinking metal ion from the gel to thus break down the gel and reduce its viscosity.

20 Claims, 2 Drawing Sheets

(51) Int. Cl.
*C09K 8/512* (2006.01)
*C09K 8/514* (2006.01)
*C09K 8/90* (2006.01)
*C09K 8/88* (2006.01)
*C09K 8/68* (2006.01)
*E21B 43/26* (2006.01)

(56) References Cited

U.S. PATENT DOCUMENTS

| | | | | |
|---|---|---|---|---|
| 4,946,604 A | * | 8/1990 | Smith | C09K 8/887 |
| | | | | 106/162.8 |
| 5,143,157 A | | 9/1992 | Harms | |
| 5,223,159 A | * | 6/1993 | Smith | C08K 5/09 |
| | | | | 166/295 |
| 5,224,546 A | | 7/1993 | Smith et al. | |
| 6,242,390 B1 | * | 6/2001 | Mitchell | C09K 8/685 |
| | | | | 166/300 |
| 6,617,285 B2 | | 9/2003 | Crews | |
| 8,215,398 B2 | | 7/2012 | Kesavan et al. | |
| 8,424,603 B2 | | 4/2013 | Loveless et al. | |
| 2002/0193343 A1 | * | 12/2002 | Khan | C09K 8/685 |
| | | | | 514/54 |
| 2003/0027883 A1 | * | 2/2003 | Phillips | C08B 11/20 |
| | | | | 522/80 |
| 2003/0083403 A1 | * | 5/2003 | Dawson | C09K 8/685 |
| | | | | 524/27 |
| 2007/0037713 A1 | | 2/2007 | Harris et al. | |
| 2007/0135311 A1 | * | 6/2007 | Van Der Horst | C09K 8/10 |
| | | | | 507/110 |
| 2013/0053283 A1 | * | 2/2013 | Maas | C08B 15/00 |
| | | | | 507/111 |
| 2013/0157905 A1 | * | 6/2013 | Saini | C09K 8/685 |
| | | | | 507/212 |

OTHER PUBLICATIONS

Ambjornsson, Helene Almlof et al., Carboxymethyl Cellulose Produced at Different Mercerization Conditions and Characterized by NIR FT Raman Spectroscopy in Combination with Multivariate Analytical Methods, BioResources 8 (2), 1918-1932, Feb. 22, 2013, Bioresources.com.

* cited by examiner

METHOD OF BREAKING METAL-CROSSLINKED POLYMERS

FIELD OF THE INVENTION

This invention relates to methods and compositions for breaking metal-crosslinked polymers. More particularly, this invention relates to method and compositions for breaking metal crosslinked polymers that have been used in treating subterranean formations.

BACKGROUND

Viscous treating fluids are commonly utilized in the drilling, completion, and treatment of subterranean formations penetrated by wellbores. Upon completion of the treatment, it is ordinarily desirable to remove the treating fluid from the well. To effectively remove the fluid, the viscosity of the fluid must be reduced. The reduction of fluid viscosity is referred to as "breaking" the gel.

A viscous treating fluid used in the treatment of subterranean formations is normally comprised of a polysaccharide or synthetic polymer in an aqueous solution which is crosslinked with an organometallic compound. Examples of well treatments in which metal-crosslinked polymers are used are hydraulic fracturing, gravel packing operations, water blocking, and other well completion operations.

In hydraulic fracturing applications a viscous treating fluid is used to transport propping materials to the formation. The treating fluid is introduced at a rate and pressure sufficient to produce a fracture or fractures in the subterranean formation and to extend the produced fracture or fractures from the wellbore into the formation. Upon the creation of the fracture or fractures, additional treatment fluid containing the propping materials can be introduced into the fracture or fractures in order to prevent complete closure. The propped fracture creates a conductive channel extending from the wellbore into the formation to facilitate the flow of oil and gas from the formation to the wellbore.

Upon completion of a treatment, it is desirable to reduce the viscosity of the treating fluid so that it can be recovered from the formation. Various materials known as "breakers" have been used to reduce the viscosity of the treating fluids. Acids, enzymes, and oxidizers are commonly used to reduce the viscosity of metal-crosslinked polymer fluids. These known breakers are somewhat effective to reduce viscosity by degrading polymer chains of the treating fluid; however, they are relatively ineffective against the metal-crosslinked portion of the polymer.

BRIEF DESCRIPTION OF THE DRAWINGS

The drawing is provided to illustrate certain aspects of the invention and should not be used to limit or define the invention.

DESCRIPTION OF SPECIFIC EMBODIMENTS

Figure 1:
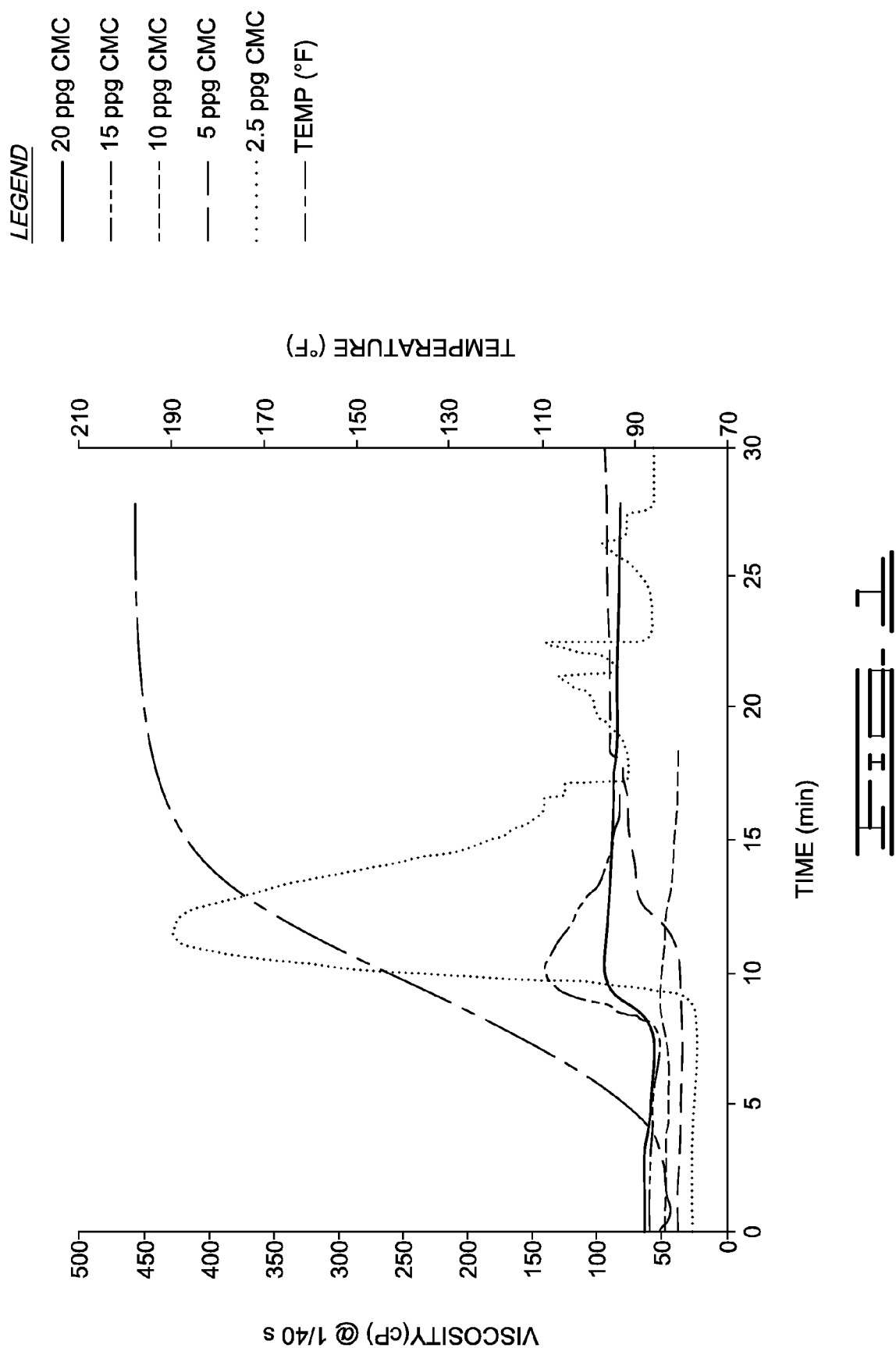
FIG. 1 is a graph of the viscosity over time for various mixtures as described in Example 1.

The present invention provides a method for improved degradation of metal-crosslinked polymer fluids. The method reduces fluid viscosity of an aqueous fluid gelled with a metal-ion crosslinked polymer by the introducing a polysaccharide having a high degree of substitution (HDS polysaccharide). The HDS polysaccharide removes the metal ion from the polymer to thus uncrosslink the polymer. Generally, polysaccharides are used to increase the viscosity of fluids; however, if has been found that HDS polysaccharides can be used to advantageously break the metal-crosslink bonding of polymers having lower degrees of substitution; thus, reducing the viscosity of the existing metal-ion crosslinked gels. The HDS polysaccharide can be used with a conventional breaker agent that degrades the polymer chains. The method of the invention is effective to at least partially remove concentrated gels, skins, or plugs which may be formed as the result of using viscous fluids during the performance of a variety of well completion practices, such as hydraulic fracturing or temporary wellbore plugging.

In performing various well stimulation practices, a viscosified treating fluid is prepared which comprises an aqueous fluid, polymer, a crosslinking agent, and various other treating fluid additives such as pH buffers, biocides, stabilizers, and other additives. The aqueous fluid can also contain salt, but the presence of salt is not essential for the practice of this invention. Typical salts which are used in well stimulation treating fluids include potassium chloride, magnesium chloride, sodium chloride, calcium chloride, other such salts, and mixtures of salts. The aqueous fluid can also be a salt water-alcohol solution having in the range of from about 0 to about 80 percent alcohol by volume. Typically the alcohols used for treating fluids have from 1 to 5 carbon atoms. The aqueous fluid can also contain liquid or gaseous carbon dioxide, nitrogen gas or the like.

In certain embodiments, the viscosified treatment fluids of the present invention also may optionally comprise salts, pH control additives, surfactants, breakers, bactericides, crosslinkers, fluid loss control additives, stabilizers, chelants, scale inhibitors, paraffin inhibitors, asphaltene inhibitors, mutual solvents, solvents, corrosion inhibitors, hydrate inhibitors, clay stabilizers, salt substitutes (such as tetramethyl ammonium chloride), relative permeability modifiers (such as HPT-1™ chemical additive available from Halliburton Energy Services, Duncan, Okla.), sulfide scavengers, fibers, nanoparticles, consolidating agents (such as resins and/or tackifiers), combinations thereof, or the like.

Also, during some or all stages of their use in various well stimulation processes, the viscosified treatment fluids can contain proppants as are known in the art. The proppant type can be sand, intermediate strength ceramic proppants (available from Carbo Ceramics, Norton Proppants, etc.), sintered bauxites and other materials known to the industry. Any of these base propping agents can further be coated with a resin (available from Santrol, a Division of Fairmount Industries, Borden Chemical, etc.) to potentially improve the clustering ability of the proppant. In addition, the proppant can be coated with resin or a proppant flowback control agent such as fibers, for instance, can be simultaneously pumped. By selecting proppants having a contrast in one of such properties such as density, size and concentrations, different settling rates will be achieved.

The aqueous fluid of the viscosified treatment fluid is used to solvate or hydrate the polymer. The polymers useful in the viscosified treatment fluid must be capable of reacting with various metal-ion crosslinkers to produce an aqueous gel. In one embodiment the polymer is a solvable polysaccharide having a degree of substitution that is less than the degree of substitution of the HDS polysaccharide (further described below). Degree of substitution or "DS" as used herein refers to the average number of hydroxyl groups on each anhydroglucose unit of the polysaccharide which are derivatized by substituent groups. In theory, the maximum obtainable value for a polysaccharide is 3; however, generally commercially available polysaccharides have a DS of less than 1.5.

Typically, the degree of substitution of the polysaccharide used for the crosslinked polymer is less than 0.5 and can be equal to or less than 0.3 or 0.1. The crosslinked polymer may be formed from a mixture of polysaccharides as long as the component polysaccharides meet the DS requirements outlined herein. Examples of suitable polymers are guar gums, guar derivatives, cellulose-based derivatives, high-molecular weight polysaccharides composed of mannose and galactose sugars, xanthan, and their derivatives and mixtures thereof. Typical examples include guar and its derivatives; and modified cellulose such as hydroxyethyl cellulose derivatives, carboxymethyl cellulose, polyanionic cellulose and other modified celluloses. Currently preferred polymers are selected from the group consisting of guar gums, guar derivatives and mixtures thereof. Examples of guar derivatives are carboxyalkyl guars and hydroxyalkylated guars like carboxymethyl guar (CMG), hydroxypropyl guar (HPG), hydroxyethyl guar (HEG), hydroxybutyl guar (HBG) and carboxymethyl hydroxypropyl guar (CMHPG).

The polymer is present in the aqueous fluid in an amount in the range of from about 0.2 to about 2.0 parts by weight polymer per 100 parts by weight aqueous fluid. The selection of a polymer concentration depends upon the actual well conditions and the type of well treatment which is to be effected.

The pH of the aqueous fluid, which contains the polymer, can be adjusted if necessary to render the fluid compatible with a crosslinking agent, which is used to increase the viscosity of the polymer solution. The pH adjusting material can be added to the aqueous fluid before, during or after the addition of the polymer to the aqueous fluid. Typical materials for adjusting the pH are commonly used acids, acid buffers and mixture of acids and bases. For example, hydrochloric acid, fumaric acid, sodium bicarbonate, sodium diacetate and sodium carbonate are typical pH adjusting agents. The pH range for the fluid and method of the present invention is from about 4 to about 12.

Various crosslinking agents are used in association with the above polymers to achieve higher viscosities than those associated with the linear polymer. Crosslinking agents are known in the art and may, for example, be based on boron, titanium, zirconium, chromium or aluminum complexes and can be used to increase the effective molecular weight of the polymer to achieve such higher viscosities in the viscosified treatment fluid. Crosslinking compounds suitable for the present invention include the variety of well-known organometallic chelates. Organic chelates of titanium, zirconium, aluminum, chromium, boron as well as other metals are well-known to those skilled in the art. The selection of an appropriate crosslinking agent depends upon the type of treatment to be performed and the polymer to be used. The amount of the crosslinking agent used also depends upon the well conditions and the type of treatment to be effected, but is generally in the range of from about 0.01 to about 0.6 parts by weight crosslinking agent per 100 parts by weight of the aqueous fluid. In some applications the aqueous polymer solution is crosslinked immediately upon addition of the crosslinking agent to form a highly viscous gel. In another application, the reaction of the crosslinking compound can be retarded so that viscous gel formation does not occur until the desired time.

After the viscosified treating fluid is formed as discussed above, and has been pumped into a subterranean formation, it is generally desirable to convert the highly viscous gel to a low viscosity fluid. This allows the fluid to be easily and effectively removed from the formation and to allow desired material such as oil or gas, to flow into the wellbore. This reduction in viscosity of the treating fluid is commonly referred to as "breaking".

There are various methods available for breaking treating fluid. Viscosified treatment fluids typically break after the passage of time and/or prolonged exposure to high temperatures. However, it is highly desirable to be able to predict and control the breaking within relatively narrow limits. Mild oxidizing agents are useful as breakers when a fluid is used in a relatively high temperature formation, although formation temperatures of 300° F. or greater will generally break the fluid relatively quickly without the aid of an oxidizing agent. One suitable oxidizing agent is ammonium persulfate. Enzymes are used as breakers for treating fluids, which are used at formation temperatures below 140° F., suitable enzymes for use are alpha and beta amylases, amyloglucosidase, oligoglucosidase, cellulase, and hemicellulase.

The conventional breaker agents typically break the viscosified treating fluids by degrading the polymer chains and, hence, leave the metal-ion crosslinking intact. Because of this, often times addition of these breaker agents to the treating fluid results in insufficient breaking of the treating fluid. Insufficient breaking means that highly concentrated gels, skins, or plugs are detected visually or experimentally in the broken fluid. In other words, although the overall viscosity of the fluid has been reduced, localized areas of crosslinked polymer are still present. In treating subterranean formations the polymer fluid may become highly concentrated as aqueous fluid is lost to the formation. Such highly concentrated polymer gels resist further breaking and may cause plugging or at the very least impair the ability of fluids to flow from the formation. Additionally, oftentimes it is desired to reduce the time required for breaking the treating fluid to be shorter than can be achieved with breaker agents that degrade the polymer chains.

A method has been discovered which provides improved degradation of metal-ion crosslinked polymer fluids. The addition of a HDS polysaccharide results in substantially complete degradation of the viscosified treatment fluid in a predictable time. It has been discovered that HDS polysaccharides can be used to advantageously break the metal-crosslink bonding of metal-ion crosslinked polymer fluids; thus, reducing the viscosity of the existing metal-ion crosslinked gels. The HDS polysaccharide can be used with a breaker agent that degrades the polymer chains. The combination of the HDS polysaccharides with such a breaker agent can hasten the breakdown of the viscosified treatment fluid; thus, reducing the time required from that for the breaker agent alone.

The HDS polysaccharides useful in the current invention are polysaccharides having a higher degree of substitution than the polymer used in the viscosified treatment fluid. Typically, the HDS polysaccharide can have a degree of substitution equal to or greater than 0.5 and the degree of substitution can be equal to or greater than 0.7 or 1.0 or 2.0. Generally, it is desired that the HDS polysaccharide have a degree of substitution that is significantly greater than that of the polymer used in the viscosified treatment fluid. Accordingly, the ratio of the degree of substitution of the polymer to the degree of substitution of the HDS polysaccharide can be at least 1:2 and, more typically, at least 1:4, at least 1:5 or at least 1:6. Generally, this ratio can fall in the range of from 1:2 to 1:50 and more typically from 1:4 to 1:30 or from 1:5 to 1:20.

Suitable HDS polysaccharides can be selected from the group consisting of cellulose, cellulose derivatives, salts thereof and mixtures thereof. Exemplary cellulose derivatives are hydroxyalkyl cellulose, carboalkyl hydroxyalkyl cellulose and carboxyalkyl cellulose, and salts thereof and mixtures thereof. In some embodiments the cellulose derivatives can be hydroxyethyl cellulose, carboxylmethyl hydroxyelthyl cellulose, carboxymethyl cellulose, and salts thereof and mixtures thereof. In a presently preferred embodiment the cellulose derivative is carboxymethyl cellulose and salts thereof and mixtures thereof. If the HDS polysaccharide is in the form of a salt, it should be a stable salt that still allows the cellulose to be water soluble, for example salts formed with ions such as Na, K, $NH_4^+$, or Al. The HDS polysaccharide is introduced to the aqueous gel in an amount such that the resultant fluid mixture has an HDS polysaccharide concentration that is sufficient to react with at least a portion of the metal ions of the crosslinked polymer but is below the concentration of HDS polysaccharide that would result in forming a significantly crosslinked network of HDS polysaccharide. Preferably, the HDS polysaccharide will be introduced in an amount sufficient to react with a major portion of the metal ions of the crosslinked polymer thus breaking a major portion of the crosslinked polymer. Generally, the HDS polysaccharide can be added in an amount from about 1 pptg (pounds per thousand gallons) to about 30 pptg of the aqueous fluid. The HDS polysaccharide can be introduced to the viscosified treatment fluid after the treatment fluid has been introduced into the borehole or can be introduced into the borehole with the viscosified treatment fluid. In the latter case the particles of HDS polysaccharide can be delayed released so as to prevent premature breaking, such as by coating the particles with a slowly dissolving material; for example, latex, polyacrylamide, PVP or chitosan.

In one preferred process for carrying out this invention a treating fluid is injected down a wellbore and into a subterranean formation at a pressure sufficient to fracture the formation. The treating fluid comprises an aqueous fluid, which is prepared by adding from about 20 pounds to about 70 pounds of polymer to each 1,000 gallons of aqueous fluid. The typical polymers used in fracturing are polysaccharide polymers. The pH of the aqueous fluid is adjusted to enable hydration of the polymer, as well as to achieve a pH compatible with the selected metal-ion crosslinking agent.

In normal fracturing operations, a polymer fluid is first introduced into the wellbore, which is then followed by the metal-ion crosslinked polymer in the form of an aqueous viscous crosslinked polymer gel composition. The metal-ion crosslinking agent can be introduced into the polymer fluid as it is injected into the wellbore. Once the fracturing with the crosslinked polymer is completed, the breaker can be introduced to the crosslinked polymer. The breaker can be introduced into the wellbore separate from and after the crosslinked polymer. Alternatively, the breaker can be in a delayed released form and be introduced into the wellbore with the crosslinked polymer. The breaker can consist of only HDS polysaccharide having a higher degree of substitution than the metal-ion crosslinked polymer but, typically will be a combination of such HDS polysaccharide with a breaker agent, which degrades the polymer chains of the crosslinked polymer.

After the breaker is introduced to the crosslinked polymer in the subterranean formation, the HDS polysaccharide is then able to react with metal ion of the crosslinked polymer. As the polymer degrades and becomes uncrosslinked by the HDS polysaccharide, the viscous crosslinked polymer gel composition begins to convert to a lower viscosity fluid. Additionally, if a breaker agent is used, the breaker agent will break the polymer chain and further reduce the viscosity. Over time, the viscosity is so reduced that the fluid is easily removed from the well without substantial impairment of the formation.

The following examples are provided to illustrate the inventive process. The examples are not intended and should not be taken to limit, modify or define the scope of the present invention in any manner.

EXAMPLE 1

The effect of a polysaccharide having a higher degree of substitution on the crosslinking of a polymer having a lower degree of substitution was tested. Five mixtures of a carboxymethyl hydroxypropyl guar (CMHPG) having a degree of substitution of 0.12 and a carboxymethyl cellulose (CMC) having a degree of substitution of 0.8 were created. Table 1 shows the concentrations of CMHPG and CMC in terms of pounds per thousand gallon (pptg) of aqueous fluid for each mixture.

TABLE 1

| Mixture No. | CMHPG Concentration (pptg) | CMC Concentration (pptg) |
|---|---|---|
| 1 | 20 | 20 |
| 2 | 20 | 15 |
| 3 | 20 | 10 |
| 4 | 20 | 5 |
| 5 | 20 | 2.5 |

2 pptg of aqueous fluid of a zirconium based crosslinker were added to each mixture. The zirconium based crosslinker used was CL-23™ crosslinker available from Halliburton Energy Services, Inc. of Duncan, Okla. The temperature of the resulting mixture was increased at a rate of 10° F. per minute until it reached a temperature of about 200° F. while measuring viscosity on a Chandler 5550 viscometer at a shear rate of 40 $s^{-1}$ The results are illustrated in FIG. 1.

As can be seen from FIG. 1, there were no large gains in viscosity until the CMC concentration was lowered below 5 pptg. Accordingly, FIG. 1 indicates the surprising result that a polysaccharide having a higher degree of substitution can prevent the crosslinking of a polymer having a lower degree of substitution without the polysaccharide being crosslinked so as to create large increases in the viscosity of the mixture.

EXAMPLE 2

The effect of a polysaccharide having a higher degree of substitution on an existing crosslinked polymer having a lower degree of substitution was tested. 30 pptg aqueous CMHPG was provided. The aqueous CMHPG was crosslinked with a zirconium based crosslinker (CL-40™ crosslinker) by adding crosslinker to achieve a concentration of 0.5 gallons per thousand gallons of the aqueous fluid. The resulting mixture was placed in a 75° C. hot water bath for 10 minutes to maximize crosslinking. The resulting aqueous gel was divided into two 50 mL samples into Chandler cups. To one cup, 5 mL of plain tap water was added on top of the crosslinked fluid. To the other cup, 5 mL of a CMC aqueous fluid was added on top of the crosslinked fluid. The CMC aqueous fluid was at a concentration of 80 pptg. The CMHPG had a degree of substitution of 0.12 and the CMC had a degree of substitution of 0.8. The viscosity of each sample was measured for 2 hours in a Chandler 5550 viscometer at a shear rate of $40_s^{-1}$ while heating the sample to 200° F. over a 10 minute heat ramp.

Figure 2:
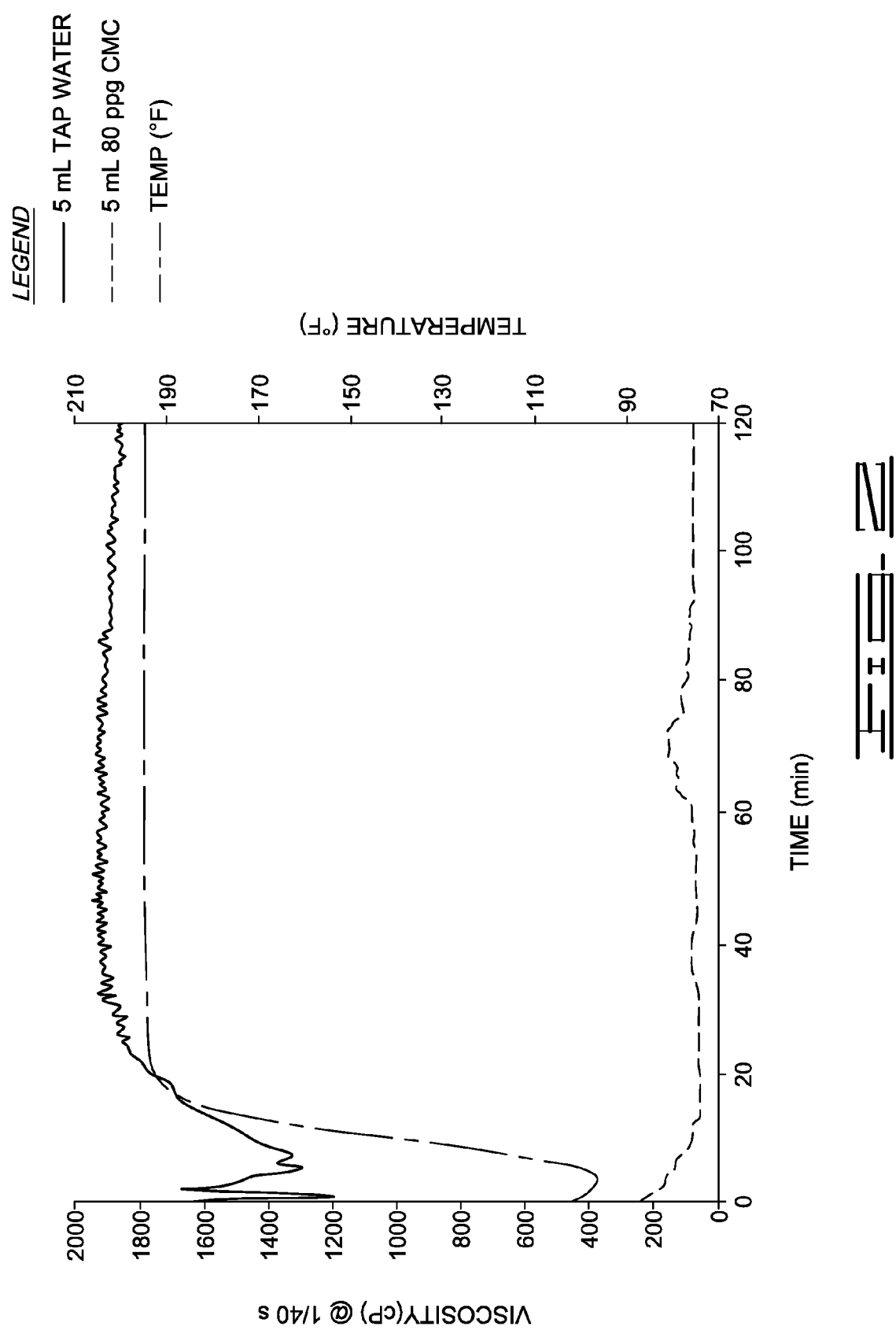
FIG. 2 is a graph of the viscosity over time illustrating the effect of an HDS polysaccharide on a metal-ion crosslinked polymer as described in Example 2.

The results are illustrated in FIG. 2. As will be noted, the water added to the control sample has little effect and the crosslinked fluid maintains a high viscosity (~1200-1900 cP) for the duration of the experiment. In contrast, the fluid to which the CMC was added loses the majority of its viscosity nearly immediately and never recovers the viscosity.

In furtherance of the above description, several embodiments will now be described. In one embodiment there is provided a method of breaking viscosity of an aqueous fluid gelled with a metal-ion crosslinked polymer. The method comprises adding a HDS polysaccharide to the aqueous fluid. The HDS has a higher degree of substitution than the metal-ion crosslinked polymer. The HDS polysaccharide chemically associates with the metal ion such that the aqueous fluid is converted to a lower viscosity fluid. Further, a breaker agent can be added to the aqueous fluid, wherein the breaker agent degrades the polymer chains of the polymer such that the aqueous fluid is converted to a lower viscosity fluid.

Generally the HDS polysaccharide is added in an amount of from about 1 pptg to about 30 pptg of aqueous fluid. Typically, the metal ion is selected from the group consisting of titanium, zirconium, boron, chromium and aluminum.

In one aspect of this embodiment, the HDS polysaccharide is selected from the group consisting of cellulose, cellulose derivatives, salts thereof and mixtures thereof; and the polymer is a polysaccharide capable of forming a crosslink with the metal ion and is selected from the group consisting of guar gums, guar derivatives, cellulose-based derivatives, high-molecular weight polysaccharides composed of mannose and galactose sugars, xanthan, and their derivatives and mixtures thereof.

In a further aspect, the HDS polysaccharide can have a degree of substitution equal to or greater than 0.5 and the polymer can have a degree of substitution less than 0.5. Alternatively, the HDS polysaccharide can have a degree of substitution equal to or greater than 0.7, and the polymer can have a degree of substitution equal to or less than 0.3. In another alternative, the HDS polysaccharide can have a degree of substitution equal to or greater than 1.0, and the polymer can have a degree of substitution equal to or less than 0.1. In still another alternative, the HDS polysaccharide can have a degree of substitution of equal to or greater than 2.0 and the polymer can have a degree of substitution of less than 0.5.

In yet a further aspect, the ratio of the degree of substitution of the polymer to the degree of substitution of the HDS polysaccharide is from 1:2 to 1:50. Alternatively the ratio can be at least 1:4 and in some embodiments can be at least 1:5 or at least 1:6. In another alternative, the ratio can be in the range of from 1:4 to 1:30 or in the range of from 1:5 to 1:20.

In a further aspect of this embodiment, the polysaccharide is selected from the group consisting of carboxyalkyl cellulose, salts thereof and mixtures thereof; the polymer is selected from the group consisting of guar gums, guar derivatives and mixtures thereof. Additionally, in this aspect the polysaccharide can be carboxymethyl cellulose, the HDS polysaccharide can have a degree of substitution equal to or greater than 0.7, and the polymer can have a degree of substitution equal to or less than 0.3.

In another embodiment, there is provided a method of treating a subterranean formation comprising the steps of:
placing a viscous crosslinked polymer gel composition into the formation, the composition comprised of an aqueous fluid, a polymer, and a metal-ion polymer crosslinker;
placing a HDS polysaccharide into the formation such that the HDS polysaccharide contacts the composition, wherein the HDS polysaccharide has a higher degree of substitution than the metal-ion crosslinked polymer; and
removing the composition from the formation after the HDS polysaccharide has chemically associated with the metal ion such that the composition has converted to a lower viscosity fluid.

In this embodiment, the method can further comprise placing a breaker agent into the formation, and the step of removing the composition occurs after the breaker agent has degraded the polymer chains of the polymer, such that the composition has converted to a lower viscosity fluid.

In an aspect of this embodiment, the HDS polysaccharide is placed in the formation in an amount of from about 1 pptg to about 30 pptg of the composition. Also, the metal ion can be selected from the group consisting of titanium, zirconium, boron, chromium and aluminum.

Further, the HDS polysaccharide can be selected from the group consisting of cellulose, cellulose derivatives, salts thereof and mixtures thereof; and the polymer is a polysaccharide capable of forming a crosslink with the metal ion and can be selected from the group consisting of guar gums, guar derivatives, cellulose-based derivatives, high-molecular weight polysaccharides composed of mannose and galactose sugars, xanthan, and their derivatives and mixtures thereof.

In a further aspect of this embodiment, the HDS polysaccharide can have a degree of substitution equal to or greater than 0.5 and the polymer can have a degree of substitution less than 0.5. Alternatively, the HDS polysaccharide can have a degree of substitution equal to or greater than 0.7, and the polymer can have a degree of substitution equal to or less than 0.3. In another alternative, the HDS polysaccharide can have a degree of substitution equal to or greater than 1.0, and the polymer can have a degree of substitution equal to or less than 0.1. In still another alternative, the HDS polysaccharide can have a degree of substitution of equal to or greater than 2.0 and the polymer can have a degree of substitution of less than 0.5.

In yet a further aspect, the ratio of the degree of substitution of the polymer to the degree of substitution of the HDS polysaccharide is from 1:2 to 1:50. Alternatively the ratio can be at least 1:4 and in some embodiments can be at least 1:5 or at least 1:6. In another alternative the ratio can be in the range of from 1:4 to 1:30 or in the range of from 1:5 to 1:20.

Also in this embodiment, the HDS polysaccharide can be selected from the group consisting of carboxyalkyl cellulose, salts thereof and mixtures thereof; and the polymer can be selected from the group consisting of guar gums, guar derivatives and mixtures thereof. Further, the HDS polysaccharide can be carboxymethyl cellulose with a degree of substitution equal to or greater than 0.7, and the polymer has a degree of substitution equal to or less than 0.3.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," "having," or "including" various components or steps, the compositions and methods can also "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of breaking viscosity of an aqueous fluid gelled with a metal-ion crosslinked polymer having a degree of substitution, said method comprising:
    adding a high degree of substitution (HDS) polysaccharide to said aqueous fluid at a temperature between 70° F. and 130° F. and without hydrolysis of the HDS polysaccharide, such that the viscosity of the aqueous fluid is reduced;
    wherein said HDS polysaccharide has a higher degree of substitution than said metal-ion crosslinked polymer.

2. The method of claim 1 wherein said HDS polysaccharide chemically associates with said metal ion to thus reduce the viscosity of said aqueous fluid.

3. The method of claim 2, wherein said metal-ion crosslinked polymer has polymer chains, and the method further comprises adding a breaker agent to said aqueous fluid, wherein said breaker agent degrades the polymer chains of said polymer such that the viscosity of said aqueous fluid is further reduced.

4. The method of claim 3 wherein said HDS polysaccharide is added in an amount of from about 1 pptg to about 30 pptg of aqueous fluid.

5. The method of claim 1 wherein said metal ion is selected from the group consisting of titanium, zirconium, boron, chromium and aluminum.

6. The method of claim 1 wherein:
    said HDS polysaccharide is selected from the group consisting of cellulose, cellulose derivatives, salts thereof and mixtures thereof; and
    said polymer is a polysaccharide selected from the group consisting of guar gums, cellulose, xanthan, and derivatives thereof and mixtures thereof.

7. The method of claim 6 wherein the degree of substitution of said HDS polysaccharide is equal to or greater than 0.5 and the degree of substitution of said polymer is less than 0.5.

8. The method of claim 7 wherein the degree of substitution of said HDS polysaccharide is equal to or greater than 0.7, and wherein the degree of substitution of said polymer is equal to or less than 0.3.

9. The method of claim 6 wherein the ratio of the degree of substitution of said polymer to said degree of substitution of said HDS polysaccharide is from 1:2 to 1:50.

10. The method of claim 6 wherein:
    said HDS polysaccharide is selected from the group consisting of carboxyalkyl cellulose, salts thereof and mixtures thereof;
    and wherein said polymer is selected from the group consisting of guar gums, guar derivatives and mixtures thereof.

11. The method of claim 10 wherein said HDS polysaccharide is carboxymethyl cellulose, and wherein the degree of substitution of said HDS polysaccharide is equal to or greater than 0.7, and the degree of substitution of said polymer is equal to or less than 0.3.

12. A method of treating a subterranean formation comprising the steps of:
    placing a viscous crosslinked polymer gel composition into said formation, said composition comprised of an aqueous fluid and a polymer crosslinked with a metal-ion crosslinker, wherein said polymer has a degree of substitution;
    placing a high degree of substitution (HDS) polysaccharide into said formation such that said HDS polysaccharide contacts said composition at a temperature between 70° F. and 130° F. and without hydrolysis of the HDS polysaccharide, wherein said HDS polysaccharide has a higher degree of substitution than said metal-ion crosslinked polymer; and
    removing said composition from said formation after said HDS polysaccharide has chemically associated with said metal ion such that the viscosity of said composition is reduced.

13. The method of claim 12, wherein said polymer has polymer chains and the method, further comprises placing a breaker agent into said formation and said step of removing said composition occurs after said breaker agent has degraded the polymer chains of said polymer such that the viscosity of said composition is further reduced.

14. The method of claim 12 wherein said HDS polysaccharide is placed in said formation in an amount of from about 1 pptg to about 30 pptg of said composition.

15. The method of claim 12 wherein said metal ion is selected from the group consisting of titanium, zirconium, boron, chromium and aluminum.

16. The method of claim 12 wherein:
    said HDS polysaccharide is selected from the group consisting of cellulose, cellulose derivatives, salts thereof and mixtures thereof; and
    said polymer is a polysaccharide selected from the group consisting of guar gums, cellulose, xanthan, and derivatives thereof and mixtures thereof.

17. The method of claim 16 wherein the degree of substitution of said HDS polysaccharide is equal to or greater than 0.5 and the degree of substitution of said polymer is less than 0.5.

18. The method of claim 17 wherein the degree of substitution of said HDS polysaccharide is equal to or greater than 0.7, and wherein the degree of substitution of said polymer is equal to or less than 0.3.

19. The method of claim 17 wherein:
    said HDS polysaccharide is selected from the group consisting of carboxyalkyl cellulose, salts thereof and mixtures thereof;
    and wherein said polymer is selected from the group consisting of guar gums, guar derivatives and mixtures thereof.

20. The method of claim 19, wherein said polymer has polymer chains, and the method further comprises:
    placing a breaker agent into said formation and wherein:
    said step of removing said composition occurs after said breaker agent has degraded the polymer chains of said polymer such that the viscosity of said composition is further reduced;
    said HDS polysaccharide is carboxymethyl cellulose; and
    the degree of substitution of said HDS polysaccharide is equal to or greater than 0.7, and the degree of substitution of said polymer is equal to or less than 0.3.

* * * * *